March 6, 1956  A. M. GAUDIN  2,737,438
RECOVERY OF URANIUM FROM GOLD ORE LEACH RESIDUES
Filed Aug. 8, 1951
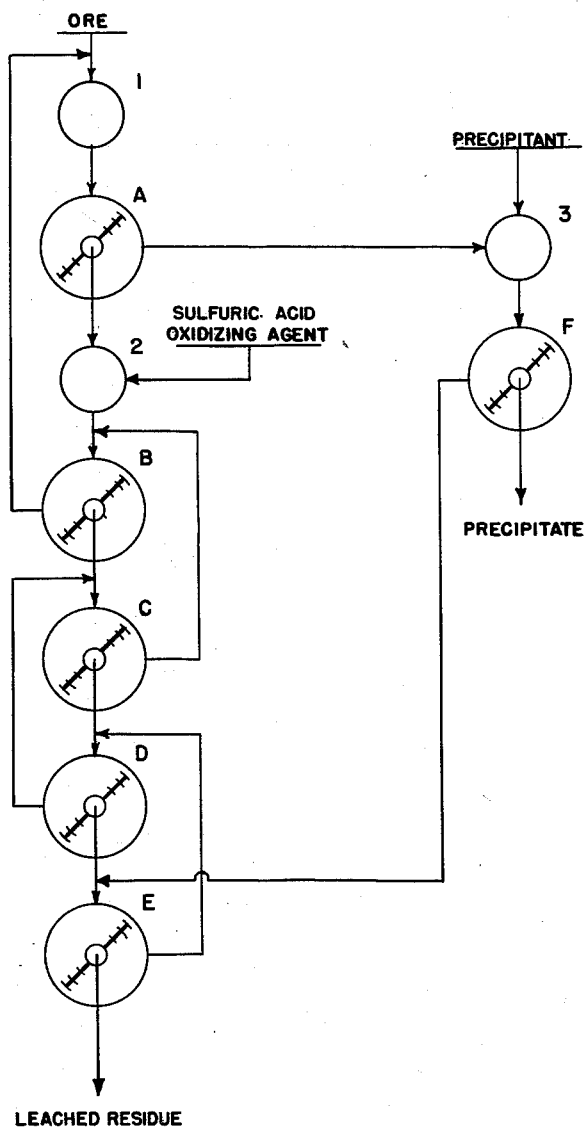
INVENTOR.
ANTOINE M. GAUDIN
BY

United States Patent Office 2,737,438
Patented Mar. 6, 1956

2,737,438

RECOVERY OF URANIUM FROM GOLD ORE LEACH RESIDUES

Antoine M. Gaudin, Newtonville, Mass., assignor to the United States of America as represented by the United States Atomic Energy Commission Application August 8, 1951, Serial No. 240,871

5 Claims. (Cl. 23—14.5)

This invention relates to an improved process for successively extracting gold and uranium from ores containing these elements, and more particularly from ores that contain only small amounts of these elements.

It has long been known that gold can be simply and efficiently recovered from ores containing only small amounts of gold by treating the ore in finely divided condition with an aqueous solution of an alkali metal cyanide. Despite the known poisonous character of the cyanides it has been found possible to carry out this process on a commercial scale without creating a serious health hazard, large because of the fact that under optimum extraction conditions the pH of the treating solution is sufficiently high to preclude the evolution of any appreciable quantity of hydrogen cyanide gas.

In cases where both gold and uranium are to be extracted from the same ore, economic reasons make it desirable that the gold be extracted first. It is known that uranium can be effectively extracted from many of its ores by leaching with aqueous sulfuric acid and subsequent neutralization of the leach solution to precipitate uranium values therefrom. However, it has been thought that if this sulfuric acid treatment were to be applied to cyanidation residues, a quantity of hydrogen cyanide would be released that would create a significant health hazard; unless the residues were first submitted to a costly pretreatment to remove residual cyanides therefrom before the sulfuric acid treatment.

I have now discovered that uranium-containing cyanidation residues, without pretreatment to remove residual cyanides, can be subjected to a modification of the above-referred to sulfuric acid treatment without appreciable amounts of hydrogen cyanide being generated. In one of its broader aspects the present process comprises the steps of treating a uranium and gold bearing ore by the conventional cyanide process, then leaching the cyanidation residues with aqueous sulfuric acid containing a small quantity of ferrous and ferric salts, and thereafter neutralizing the acid leach solution to precipitate uranium values therefrom. It has been found that when the cyanidation residues are treated with a sulfuric acid solution containing ferric and ferrous ions no appreciable evolution of hydrogen cyanide occurs.

Although I do not wish to be bound by any particular theory of the operation of the present process, my present understanding of what occurs is as follows: It appears that any alkali metal cyanides associated with the cyanidation residues react either with the ferrous ions of the leaching solution to form a complex ferrocyanide ion or with the ferric ions to form ferricyanide ions. The complex anions thereupon react with ferric and ferrous ions respectively to form the inert ferric ferrocyanide and/or ferrous ferricyanide. Thus, the cyanide is effectively immobilized in an inert compound before it can react with the acid to form hydrogen cyanide.

It has been found that the presence of the iron salts in the acid leaching solution not only have no deleterious effect on the extraction but actually increase substantially the yield of uranium that can be recovered from residues having a given uranium content. The iron can be introduced into the leaching solution in any of various ways. Good results have been obtained by adding to the solution commercial ferric sulfate such as that sold under the trade name Ferrisul. On the other hand in some cases it has been found unnecessary to add ferric sulfate as such to the solution. Many of the ores that can be treated in accordance with the present process contain a sufficient amount of iron in a form that will dissolve in sulfuric acid to provide the necessary amount of iron salts in the leaching solution. Also, prior to cyanidation it is customary to crush the ore in apparatus composed essentially of iron, and by abrasion of the surfaces of the crushing apparatus small amounts of iron are introduced into the ore and subsequently dissolve in the leaching solution. In cases where no ferric sulfate is added as such to the leaching solution, it is desirable to add an oxidizing agent such as manganese dioxide to the solution in order to maintain the necessary concentration of ferric ions therein.

In order to point out more fully the nature of the present invention the following specific example is given of an illustrative method of carrying out the present process: A uranium, gold and iron bearing ore was treated in accordance with the process outlined above. The ore was a quartzite conglomerate containing about 10% of foliated silicates, such as sericite or pyrophyllite, and also contained about 2% pyrite and 0.5% carbonaceous material. The gold and uranium were mostly in a quartzitic matrix which surrounded quartz pebbles, but the carbonaceous material also carried both gold and uranium and an appreciable proportion of the gold was locked in the pyrite. The ore contained about 0.021% uranium, predominantly in the form of uraninite, and about 0.23 ounces of gold per ton of ore.

The ore was crushed and ground until 75% to 80% passed through a 200 mesh screen. Thereafter the ore was treated in the usual manner with aqueous sodium cyanide solution to remove gold therefrom.

The cyanidation residue was then treated for removal of uranium therefrom as indicated in the flow diagram of the accompanying drawing. Referring to the drawing, ore was fed into an agitator 1 at a rate of 17 pounds per hour and pulped with overflow liquor from thickener B to 25 percent solids. This overflow liquor was at a pH of approximately 2. The pH of the slurry in agitator 1 was approximately 3.5 so that any ferric iron in the liquor feeding this agitator was precipitated. Therefore, the overflow liquor from thickener B was partially neutralized by the ore, which contained some soluble acid-consuming constituents. The retention time in agitator 1 was 11.5 hours. From agitator 1 the slurry was fed to thickener A. The overflow from this thickener was the final pregnant solution and was sent to a precipitating tank 3. The uranium in this pregnant solution was precipitated with magnesium oxide (MgO) at a pH of approximately 6.5. The precipitate was dewatered by a thickener F and the barren solution was returned to the leaching system as a wash for the residue.

The underflow from thickener A was the partially leached ore containing precipitated ferric iron. This underflow at about 50 percent solids was sent to agitator 2 to which was added sulfuric acid and additional oxidizing agent. In this instance the oxidizing agent added was manganese dioxide ($MnO_2$) which oxidized ferrous iron that had been dissolved from the ore to ferric iron. The pH in agitator 2 was approximately 2 and the retention time averaged 28.6 hours.

Slurry from agitator 2 was sent to thickener B. Overflow from thickener B was the liquid returned to agitator 1. Underflow from thickener B was the barren residue which was sent through a 3-stage countercurrent decantation system (thickeners C, D and E) for washing. The average washed residue contained 0.0041 percent $U_3O_8$, that is only 19.5 percent of the uranium originally contained in the ore; 80.5 percent of the uranium in the original ore was extracted in the leach liquor and sent to precipitation tank 3.

In this example manganese dioxide has been used as a source of oxidizing power. Its purpose, as stated above, is to convert dissolved ferrous salts to ferric salts. The dissolved ferrous salts, in turn, are provided by some acid-soluble silicate minerals in the ore, metallic iron formed by the abrasion of machinery, and the cycled barren leach liquor. Obviously, in this cyclic system the iron added to the liquor by action of the acid on metallic iron and silicate minerals equals the iron removed from the liquor in the uranium precipitate and removed with the last wash going out of the system with the spent residue. The iron content of the leach liquor overflowing B and going to agitator 1 was approximately 1.3 gram Fe per liter, an amount equivalent, in a batch system, using addition of commercial ferric sulfate, to the iron in 27 pounds ferric sulfate per ton of feed. The sulfuric acid consumed was 38.7 pounds per ton of ore and the $MnO_2$ consumed was 4.65 pounds per ton of ore. The manganese dioxide was added in such a way as to maintain a ferric iron concentration of 0.3 gram ferric iron per liter in the overflow from thickener B. This amount of manganese dioxide is equivalent in oxidizing power to approximately 22 pounds of ferric sulfate per ton of feed.

It is of course to be understood that the foregoing description is illustrative only and that numerous changes can be made therein without departing from the scope of the invention as defined in the claims appended hereto.

I claim:
1. A process for recovering uranium from a uranium and gold bearing ore which comprises the steps of extracting gold from said ore with an aqueous solution of an alkali metal cyanide, treating the residue of said gold extraction step with an aqueous sulfuric acid solution containing soluble iron salts to leach uranium values from said residues and recovering uranium compounds from the resulting leach solution.

2. A process for recovering uranium from a uranium and gold bearing ore which comprises the steps of extracting gold from said ore with an aqueous solution of an alkali metal cyanide, treating the residue of said gold extraction step with an aqueous sulfuric acid solution containing both ferrous and ferric ions to leach uranium values from said residues and recovering uranium compounds from the resulting leach solution.

3. A process for recovering uranium from a uranium and gold bearing ore which comprises the steps of extracting gold from said ore with an aqueous sodium cyanide solution, treating the residue of said gold extraction step with an aqueous sulfuric acid solution containing both ferrous and ferric ions to leach the uranium values from said residues and neutralizing the resulting leach solution to precipitate uranium compounds therefrom.

4. A process for recovering uranium from a uranium, gold and iron bearing ore which comprises the steps of extracting gold from said ore with an aqueous sodium cyanide solution, treating the residue of said gold extraction step with an aqueous sulfuric acid solution and manganese dioxide to (a) dissolve iron from said residue, (b) oxidize the dissolved iron to the ferric state and (c) cause the resulting aqueous acid solution containing ferric ions to leach uranium values from said residues, and then neutralizing the resulting leach solution to precipitate uranium compounds therefrom.

5. A process for recovering uranium from a uranium and gold bearing ore which comprises the steps of reducing said ore to a finely divided condition in apparatus made essentially of iron whereby a small amount of metallic iron is introduced into said ore, extracting gold from said ore with an aqueous sodium cyanide solution, treating the residue of said gold extraction step with aqueous sulfuric acid and manganese dioxide to dissolve the iron introduced into said ore from said apparatus and to leach uranium values from said residues, and neutralizing the resulting leach solution to precipitate uranium compounds therefrom.

References Cited in the file of this patent

UNITED STATES PATENTS

| 1,098,282 | McCoy | May 26, 1914 |
| 2,199,696 | Fleck | May 7, 1940 |

OTHER REFERENCES

MacTaggart: The Industrial Chemist, vol. 18, pp. 421–426 (November 1942).

Charrin: Chemical Abstracts, vol. 43, pp. 1291–2 (1949).

Atomics (London), vol. 1, No. 17, p. 361 (December 1950).

Atomics (London), vol. 2, No. 3, p. 70 (March 1951).